United States Patent
Hirano et al.

(10) Patent No.: US 8,249,086 B2
(45) Date of Patent: Aug. 21, 2012

(54) APPARATUS FOR FLOW CONTROL

(75) Inventors: Jun Hirano, Kanagawa (JP); Keigo Aso, Kanagawa (JP); Chun Keong Benjamin Lim, Singapore (SG); Chan Wah Ng, Singapore (SG); Tien Ming Benjamin Koh, Singapore (SG); Pek Yew Tan, Singapore (SG)

(73) Assignee: Panasonic Corporation, Osaka (JP)

( * ) Notice: Subject to any disclaimer, the term of this patent is extended or adjusted under 35 U.S.C. 154(b) by 295 days.

(21) Appl. No.: 12/302,845

(22) PCT Filed: Jun. 14, 2007

(86) PCT No.: PCT/JP2007/062468
§ 371 (c)(1),
(2), (4) Date: Mar. 30, 2009

(87) PCT Pub. No.: WO2007/145371
PCT Pub. Date: Dec. 21, 2007

(65) Prior Publication Data
US 2009/0238111 A1    Sep. 24, 2009

(30) Foreign Application Priority Data

Jun. 14, 2006  (JP) ................................. 2006-165400
Apr. 27, 2007  (JP) ................................. 2007-119134

(51) Int. Cl.
    *H04L 12/56*    (2006.01)
(52) U.S. Cl. ....................................................... 370/401
(58) Field of Classification Search .................. 370/338, 370/331, 328, 401; 455/422.1
See application file for complete search history.

(56) References Cited

U.S. PATENT DOCUMENTS

| | | | | |
|---|---|---|---|---|
| 7,035,940 | B2* | 4/2006 | Sahasrabudhe et al. | 709/242 |
| 7,746,876 | B2* | 6/2010 | Rune et al. | 370/401 |
| 2002/0021689 | A1 | 2/2002 | Robbins | |
| 2003/0235171 | A1 | 12/2003 | Lundstrom | |
| 2005/0232198 | A1 | 10/2005 | McCann | |
| 2005/0271003 | A1 | 12/2005 | Devarapalli | |
| 2006/0018273 | A1 | 1/2006 | Yamada | |
| 2006/0193295 | A1 | 8/2006 | White | |

FOREIGN PATENT DOCUMENTS

EP    1 553 734    7/2005
(Continued)

OTHER PUBLICATIONS

International Search Report dated Sep. 13, 2007.
(Continued)

*Primary Examiner* — Ricky Ngo
*Assistant Examiner* — Chandrahas Patel
(74) *Attorney, Agent, or Firm* — Dickinson Wright PLLC

(57) ABSTRACT

Disclosed is a technique which enables a mobile node (MN) connected to a mobile router (MR) to carry out flow filtering in a mobile network. This technique allows an MN 25 in a mobile network 24 to set a policy needed for the flow filtering in an MR 10 and, in the present invention, an MR inserts an egress characteristic thereof into, for example, a router advertisement message so that the egress characteristic, a node in a mobile network cannot grasp originally, can be advertised to the interior of the mobile network. Thus, the MN can grasp a characteristic of an access network (characteristic of access system 20) even in a case in which it is connected to the MR, which achieves intelligent flow filtering.

3 Claims, 7 Drawing Sheets

FOREIGN PATENT DOCUMENTS

WO 2004/036841 4/2004
WO 2004/057826 7/2004

OTHER PUBLICATIONS

C. Larsson, H. Levkowetz, T. Mahkonen T. Kauppinen, "A Filter Rule Mechanism for Multi-access Mobile IPv6," IETF Standard-Working-Draft, Internet Engineering Task Force, IETF, CH, Jun. 19, 2006, pp. 1-11.

D. Johnson, et al., "Mobility Support in IPv6," Internet Engineering Task Force, RFC3775, Standards Track, Jun. 2004, pp. 1-165.

H. Soliman, et al., "Flow movement in Mobile IPv6," Internet Draft, Jun. 2003, pp. 1-8.

N. Montavont, et al., "Home Agent Filtering for Mobile IPv6," draft-montavont-mobileip-ha-filtering-v6-00.txt, Internet Draft, Network and Protocol Team, Jul. 23, 2003, pp. 1-19.

K. Kuladinithi, et al., "Filters for Mobile IPv6 Bindings (NOMADv6)," draft-nomadv6-mobileip-filters-03.txt, MIP6 Working Group, Internet Draft, Oct. 2005, pp. 1-27.

V. Devarapalli, et al., Network Mobility (NEMO) Basic Support Protocol, Network Working Group, RFC3963, Standards Track, Jan. 2005, pp. 1-33.

H. Soliman, et al., "Flow Bindings in Mobile IPv6," draft-soliman-monami6-flow-binding-03.txt, IETF MONAMI6 Working Group, Internet-Draft, Oct. 23, 2006, pp. 1-37.

R. Wakikawa, et al., "Multiple Care-of Addresses Registration," draft-ietf-monami6-multiplecoa-12.txt, MEXT Working Group, Internet-Draft, Intended status: Standards Track, Mar. 6, 2009, pp. 1-46.

* cited by examiner

| HoA | Filter ID | CoA | ARO | Prefix-Bind |
|---|---|---|---|---|
| MN.HoA | FID1 | MN.CoA1 | MN.HoA | |
| MN.HoA | FID2 | MN.CoA2 | MN.HoA | |
| MN.HoA | | MN.CoA1 | | MR.MNP1 |
| MN.HoA | | MN.CoA2 | | MR.MNP2 |

US 8,249,086 B2

APPARATUS FOR FLOW CONTROL

TECHNICAL FIELD

The present invention relates to a communication technique in a mobile communication network, and more particularly to an apparatus for flow control, located within a mobile node or a node connected to a mobile network for realizing flow filtering of a mobile node existing in the interior of a mobile communication network.

BACKGROUND ART

The mobile IPv6 (Mobile Internet Protocol version 6) described in the following Non-Patent Document 1, i.e., the MIPv6, allows a mobile node (MN) to receive packet addressed to its own home address even in a case in which it is remote from its own home network. On the other hand, laptops or other portable electronic peripherals having a plurality of network interfaces have come into widespread use. This enables an MN to handle a plurality of care-of addresses (CoAs) bound to a single home address.

In such a heterogeneous environment, for example, there is a possibility that an MN desires to spread its own input flow regarding a plurality of network interfaces, if available. Alternatively, due to an operation related to this technique, for example, there is a possibility that the MN does not desire to receive traffic in a predetermined class.

Currently, a working group (Monami6: Mobile Nodes and Multiple Interfaces in IPv6), which makes a discussion about mobile nodes and multiple interfaces in the IPV6, is making a discussion about a flow filtering mechanism. The employment of this flow filtering mechanism enables a mobile node to specify a method of re-directing the flow to its own home agent (HA). At present, the mobile node which is an object of the discussion in the Monami6 is a mobile host but almost no discussion is made with respect to a mobile router.

An object of the flow filtering mechanism is to filter different traffics to different bi-directional tunnels between the home agent and the MN. For example, the flow filtering in the Monami6 is conducted on the basis of the address of a correspondent node (CN), source and destination port numbers, IPv6 flow labels or the like.

At present, the working group contains three internet drafts (following Non-Patent Documents 2 to 4) which provide solutions regarding the flow filtering.

The internet draft "Flow movement in Mobile IPv6" in the Non-Patent Document 2 tries to introduce a new extension of the MIPv6 which allows a host to direct a reception side flow individually to an arbitrary desired interface. This extension of the MIPv6 allows a host in a multi-home state to take full advantage of various access technologies, such as establishing a connection with traffic according to a user or an internal policy specified by an application for determining the direction of the traffic.

In addition, the internet draft "Home Agent Filtering for Mobile IPv6" in the Non-Patent Document 3 tries to introduce a new filtering option regarding a binding update (BU) message. This new filtering option allows an MN to make a request to its own home agent for adding a filter to the current flow or a future potential flow. For example, the filter indicates two types of operations by the home agent. That is, for example, the filter indicates an operation in which the home agent is required to discard a packet which does not match with the filter or indicates an operation in which the home agent is required to redirect a packet, which matches with the filter, to a care-of address (CoA) associated with this filter.

Still additionally, the internet draft "Filters for Mobile IPv6 Bindings (NOMADv6)" in the Non-Patent Document 4 or the following Patent Document 1 tries to introduce a series of different filter modules usable individually or in a state combined with each other for the establishment of complex filters. Such filters are to be relayed to a binding agent during the binding update and inserted as a mobility option into signaling. In this connection, a binding agent which can maintain a filter is referred to as a filtering agent. All the filters contained in a binding update are associated with a connection point (CoA) indicated in the binding update. Thus, the filtering agent can grasp the relationship between one flow and a specified binding.

In conjunction with the flow filtering technology for a multi-interface node (node having a plurality of interfaces) in the Monami6 working group, there is the following Non-Patent Document 6 which collects the techniques disclosed in the Non-Patent Documents 2 to 4.

According to the technique disclosed in this Non-Patent Document 6, a further extension of the idea of the flow filtering takes place and a mobile router having a plurality of interfaces is made to associate one or a plurality of flows with a care-of address (CoA). Incidentally, in the Non-Patent Document 6, a flow identifier is used for the identification of binding between a flow and a care-of address.

This extension enables an MR to associate a prefix allocated to the MN itself with one of its own CoAs and register the binding related to this association in the home agent. In consequence, the home agent can transfer the flow of a destination address agreeing with this prefix to the CoA (CoA associated with this prefix) of the MR.

Yet additionally, for use, it is also possible to combine a mechanism disclosed in the following Non-Patent Document 7 with the technique disclosed in the Non-Patent Document 6. In the Non-Patent Document 7, a unique BID (Binding Identification: binding identification information) associated with a binding update message is used for the binding among a plurality of CoAs. The combination between the techniques disclosed in the Non-Patent Document 6 and the Non-Patent Document 7 enables the binding among a plurality of CoAs to be aggregated in a more effective manner.

For example, in a case in which several flow identifiers are associated with one CoA identified by a unique BID, a mobile node can change the CoA, where the bindings of these flows take place, by only changing the CoA associated with the BID.

Moreover, the combination between the techniques disclosed in the Non-Patent Document 6 and the Non-Patent Document 7 enables easily realizing an additional function such as n-cast.

In a case in which an MN tries to carry out the n-cast of traffic flow in NEMO, it is necessary that the MN is able to indicate, to an MR, a method of transferring a flow to the MN.

Still moreover, the following Patent Document 2 proposes a method of managing a communication resource for a predetermined mobile station on the basis of a type of a communication traffic associated with this mobile station. A network specifies one or more flow type profiles. Each profile contains one or more parameter values set with respect to an estimated characteristic of a packet flow represented by the profile. In addition, each flow type profile contains defined packet matching filter and an activity timer expiration period value. In an operation thereof, the network is made to maintain an effective flow set for each mobile station on the basis of one of the flow type profiles matching with a packet data traffic regarding the mobile station. Still additionally, the network makes a judgment as to whether or not the data packet to the predetermined mobile station matches with one of the defined flow type profiles.

Yet moreover, the following Patent Document 3 discloses a method whereby an MN having a plurality of network interfaces can carry out a handover management a data flow for each flow. A plurality of home addresses for the MN are registered in the HA and these addresses are dynamically allocated to different data flows between the MN and a correspondent node (CN).

The technique disclosed in the following Patent Document 4 enables a mobile terminal connectable to a plurality of heterogeneous networks to set up and maintain virtual connections through a plurality of networks to either the same or multiple destinations. This enables the improvement of reliability of communications and the realization of efficient communications.

In addition, this Patent Document 4 also discloses a case in which a multi-access terminal has a function to duplicate traffic for further enhancement of the reliability. This arrangement is useful in a case in which a link supporting flows undergoes handover, and the traffic duplication can minimize the occurrence of packet loss or delay and the interruption of services.

The technique disclosed in the following Patent Document 5 enables an access terminal to instruct a router on a method of transferring a packet in a forward direction (downlink direction) or a method of processing (and a method of delivering) a packet in a reverse direction (uplink direction) According to the technique disclosed in the following Patent Document 5, an instruction (determination and update are made by the access terminal) related to a packet flow of the access terminal is made from the access terminal to the router, and an efficient filtering on the packet is conducted in the router. Moreover, the technique disclosed in the following Patent Document 5 also realizes the bi-cast of a data stream to a desired destination owing to the efficient filtering of the packet.

The technique disclosed in the following Patent Document 6 enables a mobile node to pass information related to an access router that the mobile node is associated to on to its home agent or other corresponding nodes. Utilizing this information, a home agent or corresponding nodes are able to send packets directly to a mobile node without incurring the overheads from route triangulation. Moreover, it is possible for the home agent or corresponding nodes to verify that a packet arriving through a tunnel with one outer source address of access routers is from an authentic source. This is due to the fact that a recipient can verify the reliability of a forwarding router, thus allowing a mobile router to forward an outer packet directly to a specified destination.

[Patent Document 1] A. Lundstorm and H. Basilier, "Applications based radio resource management in a wireless communication network", U.S. Patent Application Publication 2003/0235171A1, December 2003.

[Patent Document 2] Yamada, Mariko, Takeda, Yukiko, Morishige, Takehiro and Takahashi, Katsunori, "Mobile node, server, and communication system", U.S. Patent Application Publication 2006/0018273A1, January 2006.

[Patent Document 3] Gallego Catalina, Miguel and Janneteau, Christophe, "Data flow handover in communication using mobile internet protocol", EP Patent Application Publication 02293180, December, 2002.

[Patent Document 4] P. White and N. Girard, "Multi-access terminal with capability for simultaneous connectivity to multiple communication channels", U.S. Patent Application Publication 2006/0193295A1, Nov. 18, 2005.

[Patent Document 5] P. McCann, R. Ejzak, M. Dolan and F. Alfano, "Method for reducing service interruptions during a hand off in a wireless system", U.S. Patent Application Publication 2005/0232198A1, Apr. 4, 2004.

[Patent Document 6] C. W. Ng, P. Y. Tan and T. Ue, "Method and device for roaming-connection in global network", PCT Patent Application Publication WO/2004/036841, Apr. 29, 2004.

[Non-Patent Document 1] D. Johnson, C. Perkins and J. Arkko, "Mobility Support in IPv6", Internet Engineering Task Force Request For Comments 3775, June 2004.

[Non-Patent Document 2] H. Soliman, K. ElMalki, and C. Castelluccia, "Flow movement in Mobile IPv6", Internet Draft, June 2003.

[Non-Patent Document 3] N. Montavont and T. Noel, "Home Agent Filtering for Mobile IPv6", Internet Draft, July 2003.

[Non-Patent Document 4] K. Kuladinithi, N. A. Fikouras, C. Goerg, Koltsidas Georgios and Fotini-Niovi Pavlidou, "Filters for Mobile IPv6 Bindings (NOMADv6)", Internet Draft, October 2005.

[Non-Patent Document 5] V. Devarapalli, R. Wakikawa, A. Petrescu and P. Thubert, "Network Mobility (NEMO) Basic Support Protocol", Internet Engineering Task Force Request For Comments 3963, January 2005.

[Non-Patent Document 6] H. Soliman, N. Montavont, N. Fikouras and K. Kuladinithi, "Flow Bindings in Mobile IPv6", Internet Engineering Task Force Internet Draft, Oct. 23, 2006.

[Non-Patent Document 7] R. Wakikawa, T. Ernst and K. Nagami, "Multiple Care-of Addresses Registration", Internet Engineering Task Force Internet Draft, October 2006.

However, in a case in which a flow filtering mechanism described in the Monami6 is applied to the network mobility (NEMO) in the Non-patent Document 5, the tunnel terminates at a mobile router (MR), while the traffic terminates at an MN. Since the MR cannot grasp the traffic requirements on a flow to the MN for achieving intelligent flow filtering, if the MR has an egress access, a problem arises in a flow filtering mechanism. In addition, it is impossible that the MN grasps a characteristic (egress characteristic) of an access network for the implementation of the intelligent flow filtering on the basis of various mobile network prefixes (MNPs) notified from the MR.

That is, in a case in which the concept of the NEMO is applied to the Monami6, a bi-directional tunnel through which traffic up to the MN within the mobile network passes, terminates at the MR. For this reason, for example, if there are a plurality of egress routes in the mobile network with which the MN is in connection (for example, in a case in which one MR has a plurality of egress interfaces, when a plurality of routers each having an egress route exist within the mobile network, or in other cases), it is impossible that the MN carries out the flow filtering in a state where sufficient consideration is given to the characteristic (egress characteristic of the MR) of a network lying at a higher-order position of the MR. Accordingly, there is a problem which arises at the present stage in that difficulty is encountered in applying the concept of the NEMO completely to the Monami6.

In addition, in the case of the employment of the technique in the Patent Document 2, even if the MR executes the matching function, the mobile station cannot acquire the egress characteristic of the MR, so the above-mentioned problem regarding the NEMO still exists.

Still additionally, in the case of the technique in the Patent Document 3, although there is the description to the effect of using the standard mobile IPv6 technology so that the HA can notify a plurality of home addresses to the MN, if an MR is introduced thereinto, it is impossible to notify egress conditions of the MR to the MN through the use of the standard mobile IPv6 mechanism.

Yet additionally, with the technique in the Patent Document 4, there exists a problem in that, when one mobile terminal (first mobile terminal) is positioned under a different mobile terminal (second mobile terminal) so as to establish an nested state, the determination on the duplication of the traffic is made by the second mobile terminal (host mobile terminal). Accordingly, this leaves very little control scope to the original data sender/receiver (i.e., the first mobile terminal), which is naturally made to carry out the determination control on the duplication of the traffic flow, when it is placed into a nested state under a different mobile terminal.

Moreover, in the case of the technique in the Patent Document 5, there exists a problem in that, when one access terminal (first access terminal) is positioned under a different access terminal (second access terminal) so as to establish an nested state, the first access terminal cannot grasp the fact that the second access terminal has a plurality of links when setting a special filter.

Furthermore, in the case of the technique in the Patent Document 6, there exists a problem in that, a home agent or correspondent node is unable to filter the traffic flows of the mobile node via a mobile router with multiple egress routes (e.g. care-of addresses). The reasoning being that the mobile node does not know the care-of addresses of the mobile router, thereby the mobile node is unable to set filters at the home agent or correspondent node specifying which route to use for the various traffic flow of the mobile node. Similarly, the mobile router has no knowledge on how the mobile node wants the traffic flow to be routed.

DISCLOSURE OF THE INVENTION

For the solution to the above-mentioned problems, it is an object of the present invention to provide an apparatus for flow control for solving a problem arising in a case in which a mobile node configures a flow policy through the use of a proxy node. In particular, the object of the present invention is to provide an apparatus for flow control whereby a mobile node connected to the interior of a mobile network pertaining to a mobile router described in the NEMO can carry out a flow filtering mechanism described in the Monami6.

For achieving the above-mentioned purpose, in accordance with the present invention, there is provided an apparatus for flow control which is located in a mobile router having a mobile network as a subordinate, comprising:

one or a plurality of egress interfaces used for communication with a node existing in the exterior of the mobile network;

one or a plurality of ingress interfaces used for communication with a node connected to the mobile network;

a filter policy list storing a flow filter policy describing at least association between traffic of the node connected to the mobile network and identification information on the egress interface to be used for the traffic; and matching means for, when a packet is transferred from the node connected to the mobile network, retrieving the flow filter policy of the node from the filter policy list to select the egress interface to be used for the transfer of the packet by referring to the retrieved flow filter policy.

With this configuration, even in a case in which a mobile node is connected to a mobile router, the mobile node can arrange a flow filter policy through a mobile router.

In addition, combined with the above-mentioned configuration, the apparatus for flow control according to the present invention comprises characteristic information inserting means for inserting information indicative of a characteristic of a network, with which the egress interface of the mobile router is in connection, into a router advertisement message to be transmitted through the ingress interface into the interior of the mobile network.

With this configuration, a node in a mobile network can grasp a characteristic (network characteristic, egress characteristic) of a host network of a mobile router, the node in the mobile network originally fails to grasp.

Still additionally, combined with the above-mentioned configuration, the apparatus for flow control according to the present invention comprises:

virtual identifier information setting means for setting virtual identifier information for identifying information indicative of the network characteristic; and virtual identifier information storing means for storing the association between the virtual identifier information and the network characteristic.

With this configuration, a mobile router can manage network characteristic of an egress interface of a mobile router by mapping it relative to a virtual identifier.

Yet additionally, combined with the above-mentioned configuration, the apparatus for flow control according to the present invention comprises virtual identifier information updating means for, when a variation of the network characteristic occurs, re-establishing the association between the virtual identifier information and the network characteristic so as to update the association between the virtual identifier information and the network characteristic.

With this configuration, in the case of a change of the network characteristic of an egress interface of a mobile router, it is possible to cope with this change by re-establishing the association between the virtual identifier information and the network characteristic.

Moreover, combined with the above-mentioned configuration, in the apparatus for flow control according to the present invention, same virtual identifier is allocated to, of the network characteristics of the plurality of egress interfaces, the network characteristics similar in type to each other so as to aggregate the plurality of network characteristics into one virtual identifier.

This configuration allows a plurality of egress interfaces having similar network characteristics to be indicated by one virtual identifier, thereby suppressing the virtual identifiers up to a desired finite number. In addition, in particular, in a case in which mobile routers are connected in hierarchical relation to each other and a large number of network characteristics exist in a host network (a large number of flows exist therein), the virtual identifiers are suppressible up to a desired finite number.

Still moreover, combined with the above-mentioned configuration, in the apparatus for flow control according to the present invention, upon receipt of a request from the node connected to the mobile network, the characteristic information inserting means inserts the information indicative of the network characteristic into the router advertisement message.

This configuration enables a mobile router to properly transmit the router advertisement message including the information indicative of the network characteristic to a node in a mobile network which requires the information.

Yet moreover, combined with the above-mentioned configuration, in the apparatus for flow control according to the present invention, the network characteristic is allocated to a predetermined range of an address prefix used in the mobile network.

This configuration enables the network characteristic of an egress interface of a mobile router to be managed by mapping it into a predetermined range of an address prefix used in the mobile network.

Furthermore, combined with the above-mentioned configuration, in the apparatus for flow control according to the present invention, the characteristic information inserting means is made to insert the information indicative of the network characteristic into the router advertisement message transmitted periodically.

With this configuration, for example, even in the case of a change of a network characteristic of an egress interface of a mobile router, the change can be reflected in a node within a mobile network through the use of the router advertisement message transmitted in a periodic fashion.

Still furthermore, combined with the above-mentioned configuration, in the apparatus for flow control according to the present invention, the flow filter policy of the node is received from the node connected to the mobile network and the received flow filter policy is stored in the filter policy list.

With this configuration, a flow filtering in a mobile router is realizable on the basis of a flow filter policy arranged by the node itself in a mobile network.

Yet furthermore, combined with the above-mentioned configuration, the apparatus for flow control according to the present invention comprises default router option inserting means for inserting a default router option, to the effect that the mobile router itself functions as a default router, into the router advertisement message.

This configuration enables a mobile router to indicate, to a node in a mobile network, the fact that the mobile router itself is a default router.

In addition, combined with the above-mentioned configuration, in the apparatus for flow control according to the present invention, each of the plurality of egress interfaces is associated with a value of a specified one bit of an address prefix for use in the mobile network, and information containing an address prefix set so that the packet is transmitted through each of the plurality of egress interfaces according to the specified one bit value associated with each of the egress interfaces is inserted into a router advertisement message transmitted through the ingress interface to the interior of the mobile network.

This configuration enables the determination of an egress interface, through which a packet to be transmitted to a node in a mobile network passes, according to the value of a specified bit.

For achieving the above-mentioned purpose, in accordance with the present invention, there is provided an apparatus for flow control which is located in a node connected to a mobile network under a mobile router, comprising:

characteristic information acquiring means for acquiring information indicative of a characteristic of an egress interface of the mobile router from the mobile router;

flow filter policy generating means for generating a flow filter policy describing at least the association between traffic of the node and identification information on the egress interface of the mobile router to be used for the traffic on the basis of the information acquired by the characteristic information acquiring means; and flow filter policy transmitting means for transmitting the flow filter policy to the mobile router.

With this configuration, a node in a mobile network can grasp a characteristic (network characteristic, egress characteristic) of a host network, the node in the mobile network fails originally to seize, and configure a flow filter policy on the basis of this information and notify it to the mobile router.

Moreover, combined with the above-mentioned configuration, in the apparatus for flow control according to the present invention, the characteristic information acquiring means is made to extract a network characteristic inserted into a router advertisement message transmitted from the mobile router.

With this configuration, a node in a mobile network can acquire information on a characteristic of a host network of a mobile router, which is needed for the arrangement of its own flow filter policy, from a router advertisement message transmitted from the mobile router.

According to the present invention, a proxy node (for example, mobile router) advertises its own access characteristic to a node (for example, mobile node in a mobile network) so that the mobile node can carry out a flow filtering mechanism, which provides an advantage of solving a problem arising in a case in which the mobile node configures a flow policy thereof through the proxy node. In particular, the present invention can provide an effect that a mobile node connected to the interior of a mobile network of a mobile router mentioned in the NEMO can implement a flow filtering mechanism mentioned in the Monami6.

BEST MODE FOR CARRYING OUT THE INVENTION

Embodiments of the present invention will be described hereinbelow with reference to the drawings. First of all, the following terms will be defined for the purpose of a better understanding of the present invention.

A "multimode node" indicates a node (host or router) having several selectable IPv6 addresses which can be selected. For example, this signifies that this node can receive a plurality of prefixes notified (advertised) on a link connected thereto or that this node has a plurality of selectable interfaces irrespective of whether or not it is connected to the same link.

A "mobile network prefix (MNP)" signifies an IPv6 prefix delegated to a mobile router and notified (advertised) in a mobile network. The advertisement of one or more mobile network prefixes is feasible within a mobile network.

A "router advertisement (RA)" signifies a packet to be transmitted periodically or as a response to a router solicitation message by a router for notifying the presence thereof (existence of the router) together with diverse link parameters or internet parameters. The router advertisement contains on-link determination and/or address configuration, recommended hop limit value and others.

In the following description, for the purpose of explanation, specific numerical values, times, structures, protocol names and other parameters are set for allowing a sufficient understanding of the present invention. However, it will be apparent to a person skilled in the art that the present invention is practicable without these specific detailed definitions. Moreover, well-known components and modules are shown in block diagrams for avoiding the prevent invention from becoming unclear unnecessarily.

Figure 1:
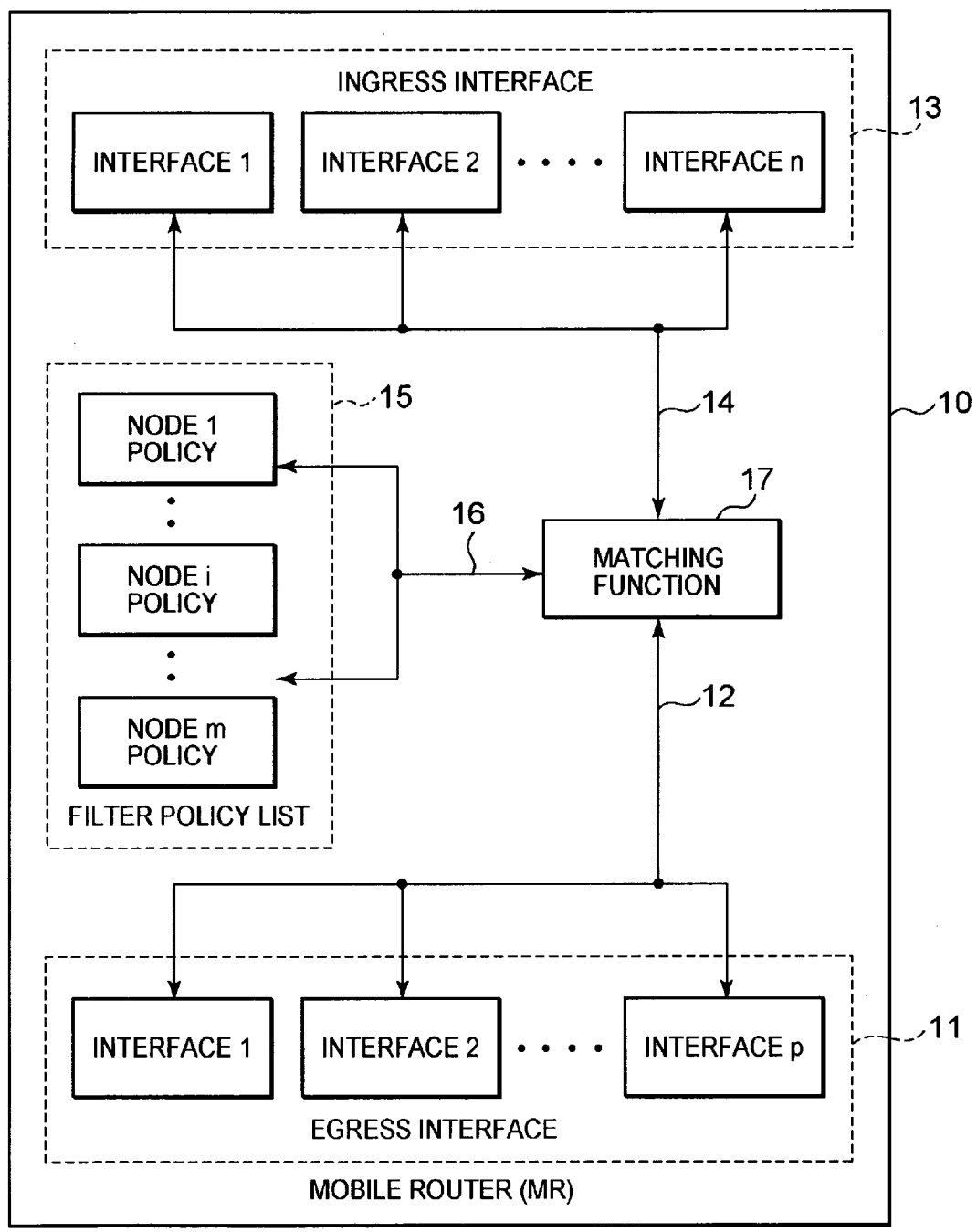
FIG. 1 is a block diagram showing one example of a configuration of a mobile router according to an embodiment of the present invention.

Referring to FIG. 1, a description will be given hereinbelow of a preferred component of a mobile router (MR) according to the present invention. In a concrete example shown in FIG. 1, an MR 10 functions as a multimode node and includes one or a plurality of egress interfaces 11. Owing to this egress interface 11, the MR 10 can establish diverse bi-directional tunnels with respect to its own home agent (HA) or receive a router advertisement. As a preferred concrete example, the egress interface 11 is, for example, Wi-Fi, Bluetooth (registered trademark) or Cellular, but the present invention is not limited to these.

In addition, the MR 10 has one or a plurality of ingress interfaces 13. Owing to this ingress interface 13, the MR 10 can make a communication with a node in its own mobile network or transmit a router advertisement to the interior of its own mobile network. As a preferred concrete example, the ingress interface 13 (access interface 13) is, for example, Wi-Fi or Bluetooth, and a packet transmitted from the access interface 13 is, for example, a router advertisement, but the present invention is not limited to these.

Still additionally, the MR 10 has a filter policy list 15. The filter policy list 15 contains one or a plurality of filter policies (node i policies) configured by nodes connected to the MR 10. The filter policy of a given node can be stored with, for example, an XML (Extensive Markup Language) format, but the present invention is not limited to this.

Yet additionally, the MR 10 has a matching function 17. Owing to this matching function 17, the MR 10 can grasp which of the egress interface 11 is made to transmit a packet of a node. The MR 10 receives a packet through this ingress interface 13 from a node in its own mobile network and sends this packet through a path 14 to the matching function 17. The matching function 17 starts the processing to retrieve a filter policy of this node from the filter policy list 15 through a path 16. Furthermore, the MR 10 matches this packet to a correct egress interface 11 through the use of the retrieved policy and sends the packet through a path 12 to the aforesaid correct egress interface 11.

Figure 2:
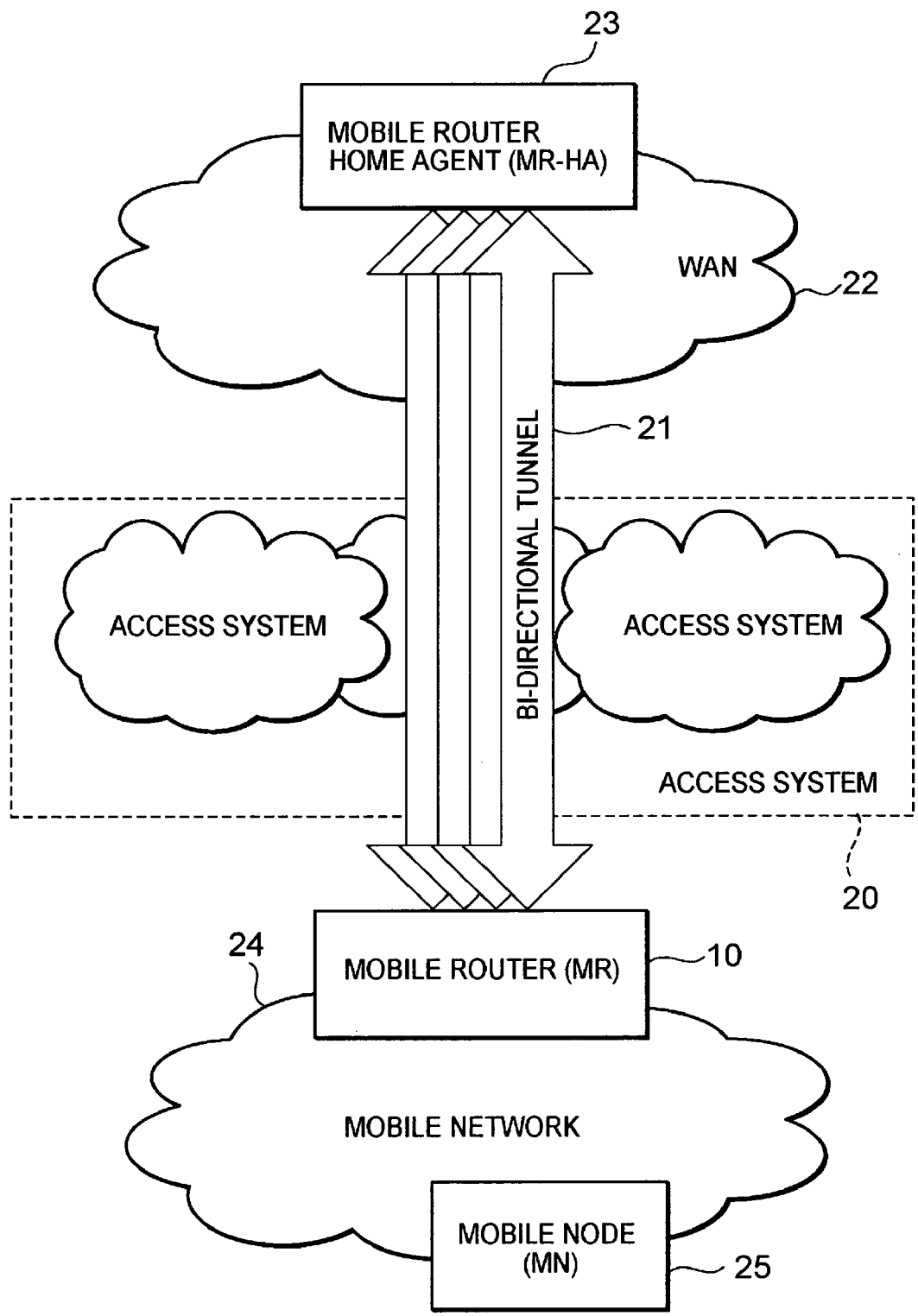
FIG. 2 is an illustration of one example of a configuration of a system according to an embodiment of the present invention.

Secondly, referring to FIG. 2, a description will be given hereinbelow of a preferred system according to the present invention. In this preferred system, a mobile network 24 has an MR 10. The MR 10 is a router capable of changing its own connection point to a global network to move from one link to another link. For example, it is preferable that the MR 10 can transmit a packet on the basis of a policy set by a mobile node (MN) 25 among a plurality of interfaces.

Moreover, the MR 10 is capable of transmitting a router advertisement within the mobile network 24. Although it is acceptable that the router advertisement to be transmitted contains, for example, an egress characteristic of the MR 10, a virtual identifier thereof and others, the present invention is not limited to these. Incidentally, a person skilled in the art would recognize that the above-mentioned information can be inserted into a router advertisement message according to an ICMP option format.

Still moreover, the mobile network 24 contains a mobile node (MN) 25. The MN 25 is a node connected to the MR 10 in the mobile network 24. In this preferred system, the MN 25 is capable of setting a flow filter policy with respect to a home agent (hereinafter referred as an MN-HA), not shown in FIG. 2, or the MR 10. It is preferable that the MN 25 is realizable as a mobile node or a fixed node. In addition, the MN 25 is, for example, printer, personal computer, other electronic peripherals or the like, but the present invention is not limited to these. In this case, although there is shown a case in which one MN 25 exists within the mobile network 24, a person skilled in the art would recognize that one or a plurality of MNs 25 (which belong to the use of the mobile network 24 or which do not belong thereto) can lie therein. Still additionally, a person skilled in the art would recognize that the MN 25 itself is a mobile router and a mobile network can exist under it and that, conversely, the MR 10 itself is connectable to a different mobile network. Incidentally, there is a case in which MN-HA agrees with MR-HA.

The MR 10 functions as a multimode node and is capable of gaining access through one or a plurality of access systems 20 to a wide area network (WAN) 22. In this preferred system, the access system 20 is, for example, Wi-Fi, Bluetooth (registered trademark) or Cellular, but the present invention is not limited to these. Moreover, in this preferred system, the MR 10 establishes one or a plurality of bi-directional tunnels 21 with respect to its own home router (mobile router home agent: MR-HA) 23. Incidentally, although the establishment of the bi-directional tunnel 21 is based upon, for example, the utilization of the internet key exchange (IKE) technology, the present invention is not limited to this technology. The MR-HA 23 sends a received packet to each destination on the basis of a policy set in the MR-HA 23 by the MR 10.

In a case in which the MR 10 lies within its own home network, the MR 10 configures one or a plurality of home addresses (HoAs) and registers them in the MR-HA 23. In addition, in a case in which the MR 10 establishes a connection with the access system 20 through an access router, since the MR 10 is a multimode node, it configures one or a plurality of care-of addresses (CoAs). With respect to each of the CoAs of the MR 10, the MR 10 establishes a bi-directional tunnel with respect to the MR-HA 23 and transmits a binding update (BU) message for the registration of this specified CoA to the MR-HA 23. Upon receipt of the BU message from the MR 10, the MR-HA 23 maps the HoA of the MR 10 into the designated CoA of the MR 10, thereby updating its own binding cache entry. Thus, even in the case of being remote from the home network, the MR 10 can receive a packet, the destination of which is this HoA.

The MR 10 makes a request for one or a plurality of MNPs to the MR-HA 23 and the MR-HA 23 conducts the allocation of the MNPs in a static or dynamic fashion. As the technique for the allocation of prefixes, for example, a DHCPv6 prefix delegation is employable, but the present invention is not limited to this. The MR-HA 23 transmits an RA containing one or a plurality of MNPs to the MN 10. Thus, the MR-HA 23 can manage the MNP to be used by the MR 10. Moreover, the MR 10 can generate one or a plurality of MNPs to be notified to a node or router within the mobile network 24 and register them in the MR-HA 23. In this way, the MR 10 can generate the MNP(s) dynamically, thereby enabling the reduction of the load in the MR-HA 23. If the MR 10 has one or a plurality of valid MNPs, the MR 10 stores them in a prefix cache. As another preferred example, it is also acceptable that, for example, the MNP is configured manually and is stored in a non-volatile memory of the MR 10.

Figure 3:
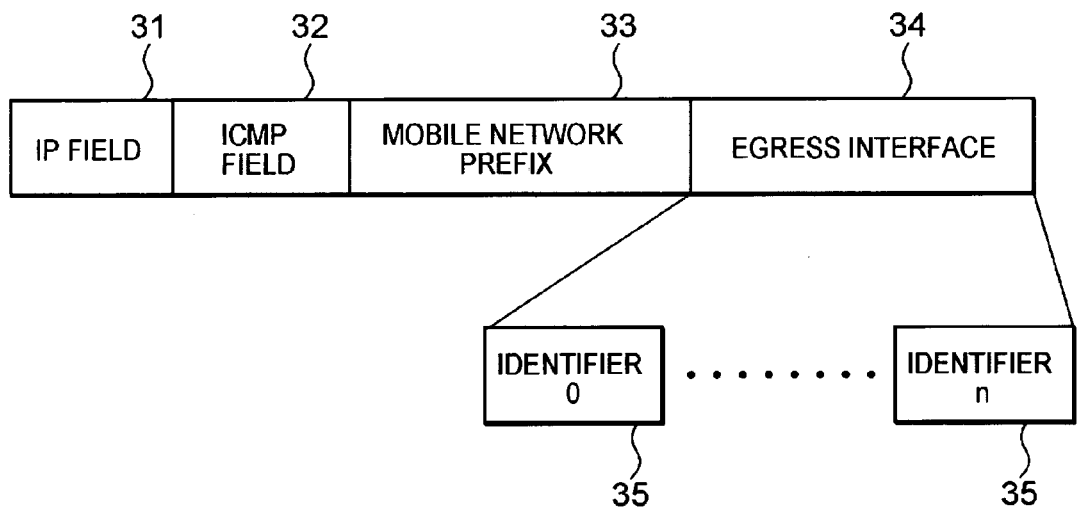
FIG. 3 is an illustration of one example of a router advertisement to be transmitted by a mobile router in an embodiment of the present invention.

Furthermore, after the acquisition of a needed prefix, the MR 10 configures a router advertisement including the prefix to be notified to the interior of the mobile network 24. FIG. 3 is an illustration of one example of a router advertisement to be transmitted by a mobile router in a preferred embodiment of the present invention. An RA 30 designates a router advertisement generated by the MR 10 and contains an IP field 31 describing an IP header of the RA 30. For example, the IP field 31 contains a source address and destination address of an interface of the MR 10, but the present invention is not limited to this. Usually, the router advertisement is multicasted to a plurality of nodes, and the destination address thereof is a multicast destination address. On the other hand, when there is a request for a router advertisement, the destination address can be a unicast address. Moreover, the RA 30 can have an internet control message protocol (ICMP: Internet Control and Management Protocol) field 32. The ICMP field 32 is used for carrying out the internet-layer functions. Although in a preferred embodiment of the present invention the ICMP field 32 contains, for example, an address configuration flag and a router lifetime, the present invention is not limited to this.

The RA 30 further has a mobile network prefix (MNP) 33. The MNP 33 can carry one or a plurality of prefixes to be used by the mobile node 25 for the address configuration. The RA 30 further has egress information 34. The egress information 34 is for notifying information on an egress characteristic of the MR 10 to a mobile node within the mobile network 24. In a preferred embodiment of the present invention, preferably, the egress information 34 contains, for example, one or a plurality of identifiers 35 (which allows to a node to set a relevant flow policy by use of this information), but the present invention is not limited to this. Moreover, in the RA 30, the egress characteristic is, for example, a jitter or data rate of the access system 20, but the present invention is not limited to this. Still moreover, although as the identifier 35 it is possible to use a combination of, for example, physical interfaces or virtual identifiers of the MR 10, the present invention is not limited to this.

Figure 4:
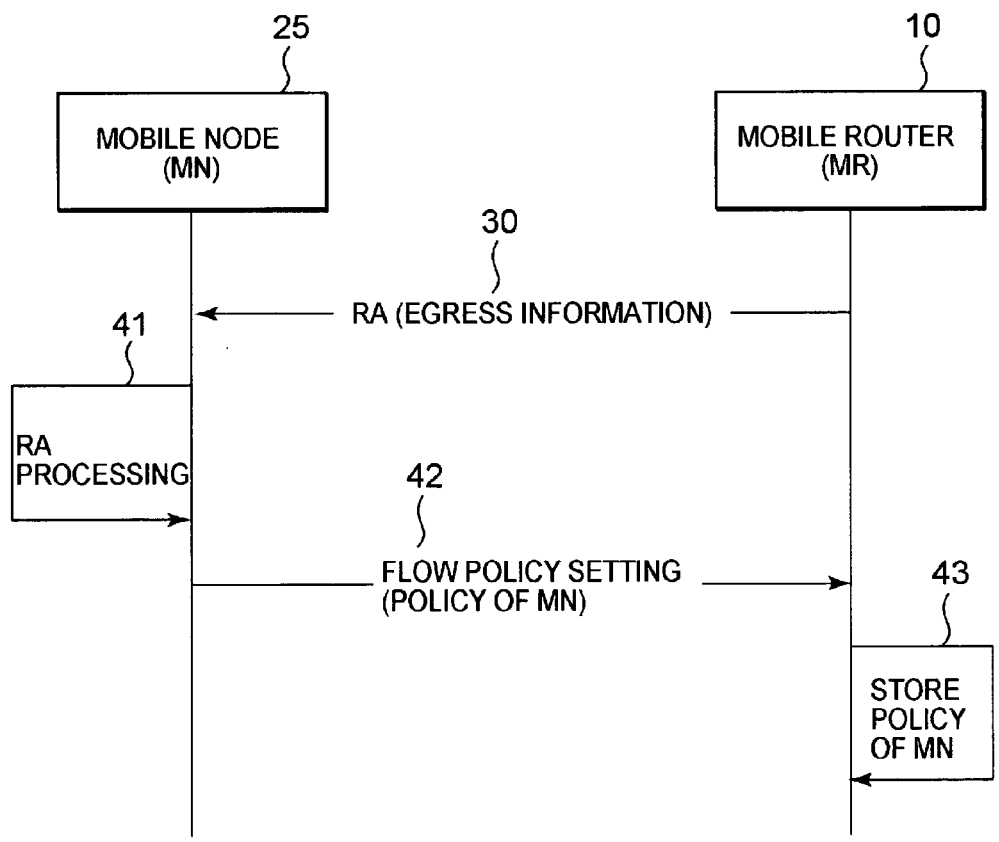
FIG. 4 is a sequence chart showing one example of a flow policy setting method to be conducted by a mobile node in an embodiment of the present invention.

FIG. 4 is a sequence chart showing one example of a flow policy setting method in a mobile router, which is to be conducted by a mobile node, according to a preferred embodiment of the present invention. In this case, the MR 10 multicasts the RA 30 including the egress information 34 to the interior of the mobile network 24. In a preferred embodiment of the present invention, the egress information 34 contains information indicative of a physical interface of the MR 10. Moreover, although, for example, an address prefix is available as each identifier 35 of the egress information 34, the present invention is not limited to this. Upon receipt of the RA 30, the MN 25 carries out the retrieval processing (RA processing) 41 on the egress information 34 for configuring a necessary flow policy to be transmitted to the MR 10. In a preferred embodiment of the present invention, for example, on the basis of a user's judgment regarding a quality of service (QoS) suitable for a desired traffic, a determination is made that the MN 25 configures a flow policy, but the present invention is not limited to this. When the MN 25 sets a flow policy, it transmits a flow policy setup message 42 including the flow policy of the MN 25 to the MR 10. Moreover, upon receipt of the flow policy setup message 42, the MR 10 stores the policy of the MN 25 in the filter policy list 15 thereof as indicated by the processing 43.

In a preferred embodiment of the present invention, although the MR 10 multicasts the RA 30 including the egress information 34 into the mobile network 24, a person skilled in the art would recognize that it is also acceptable that the RA 30 is directly transmitted from the MR 10 to the MN 25 (for example, by means of unicast). Moreover, as another preferred embodiment, it is also appropriate that the MR 10 multicasts the RA 30, which does not including the egress information, to the interior of the mobile network 24 and, in response to a request from a router advertisement from the MN 25, transmits a solicited RA 30 including the egress information 34. Thus, the MR 10 is not required to always notify the egress information 34 inserted into the RA 30 to all mobile nodes within the mobile network 24, there by allowing the reduction of band consumption within the mobile network 24.

In addition, as a different preferred embodiment, it is also appropriate that the MN 25 acquires the egress information on the MR 10 by use of a stateful address configuring means. For example, the MN 25 transmits a DHCP discovery message to look for a DHCP server within the mobile network 24. The DHCP server maintains a pool of addresses usable in the mobile network 24 and, for example, in a case in which the MR 10 is a DHCP server (alternatively, when the MR 10 and the DHCP server are in cooperation with each other), the addresses usable in the mobile network 24 are mapped into various egress characteristics under management of the MR 10. For example, one of the addresses existing in an address pool is associated with a characteristic of a wireless LAN interface.

Still additionally, the MR 10 functioning as a DHCP server transmits a DHCP response message including a list of pool of mapped address to the MN 25. When the MN 25 discovered an appropriate egress characteristic which satisfies the desired traffic requirements with respect to a given flow, the MN 25 uses, for this flow, an address mapped into the egress characteristic and sets a desired filter rule(s) for the flow filtering.

In this connection, it is also acceptable that, for example, the DHCP server provides an address list to the MN 25 and inserts information indicative of a network characteristic (egress characteristic), associated with each address, into a DHCP offer message which is a response to a DHCP discovery message. The MN 25 selects an address on the basis of a desired network characteristic and confirms the use of the selected address through the use of a DHCP accept message.

Incidentally, although there is no need for the DHCP server and the MR 10 to pertain to the same entity, in the case of different entities, it is necessary that the MR 10 and the DHCP server can exchange the information on an egress network characteristic and the information on a method for the mapping between a virtual identifier and a prefix of an address.

In a case in which the MR 10 roams across the access system 20, there is a possibility that a change of the egress characteristic of the MR 10 occurs. The MR 10 is required to correct the egress information 34 to be inserted into the RA 30 and re-notify a new RA 30 to the interior of the mobile network 24. At this time, the mobile node 25 within the mobile network 24 corrects the policy on the basis of the change of the egress characteristic of the MN 10 and conducts the updating with respect to the MR 10. Moreover, upon receipt of the policy list updated by the mobile node, the MR 10 updates the filter policy list 15. This mapping method is such that the mobile nodes which monitor the egress conditions of the MR 10 corrects the flow filter policy through the use of their filtering agents. This preferred mapping method provides an advantage that the MN can carry out better adjustment of the traffic for a packet. Moreover, in a preferred embodiment of the present invention, although the filtering agent is, for example, a home agent, correspondent node (CN), mobile anchor point (MAP) or the like, the present invention is not limited to this. Still moreover, in the preferred embodiment of the present invention, a mobile node having an appropriate processing capability can carry out the flow filtering mechanism more efficiently.

Figure 5:
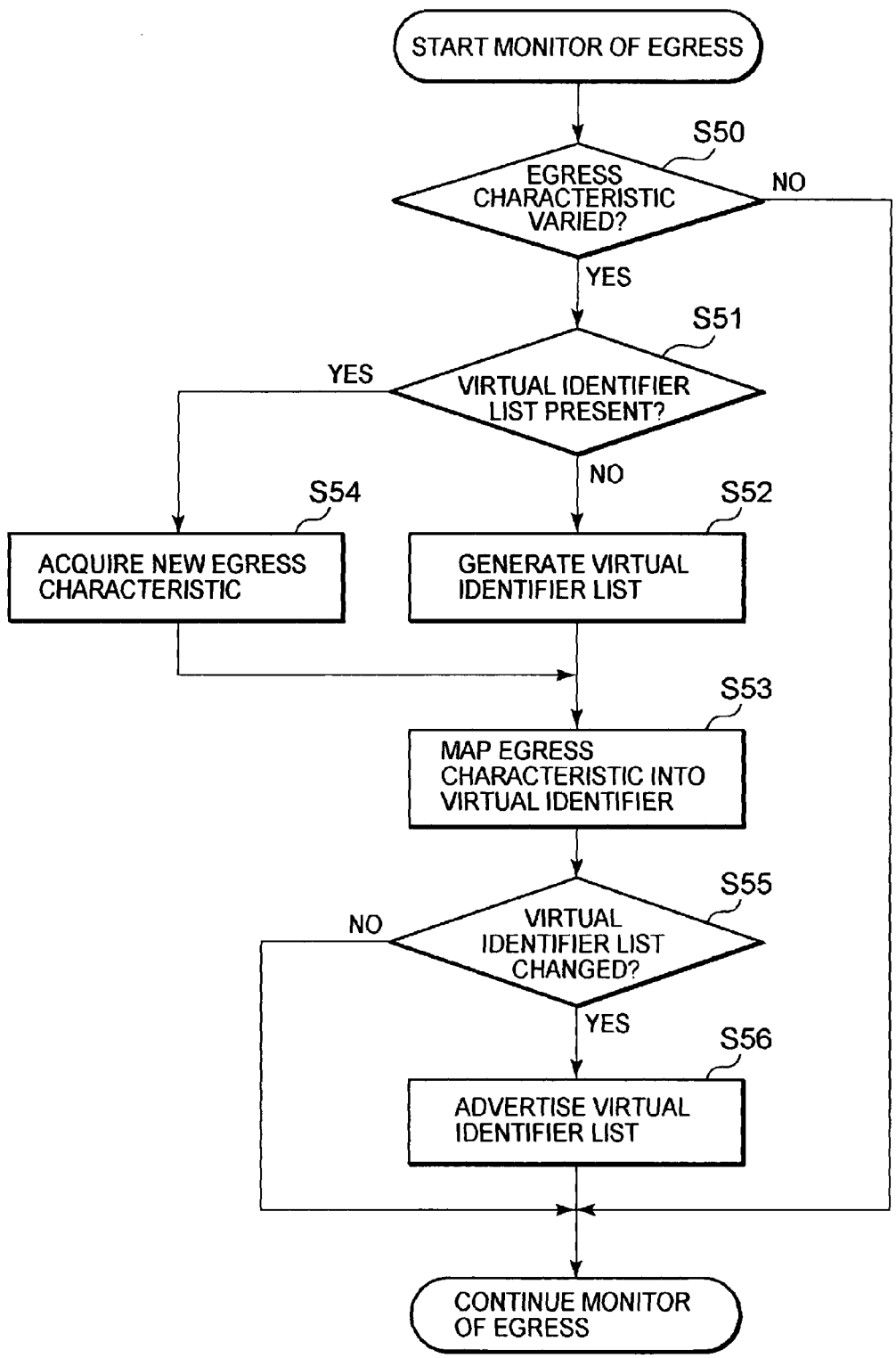
FIG. 5 is a flow chart showing one example of a virtual identifier mapping method to be conducted by a mobile router in an embodiment of the present invention.

FIG. 5 is a flow chart showing one example of a virtual identifier mapping method to be conducted by a mobile router according to a further preferred embodiment of the present invention. In the following preferred embodiment of the present invention, the egress information 34 of the RA 30 includes information on a virtual identifier of the MR 10 which is indicative of a physical interface of the MR 10. As each of the identifiers 35 in the egress information 34, it is possible to use, for example, an address prefix or the like, but the present invention is not limited to this. Moreover, in this preferred embodiment, the MR 10 is in a state just activated within the mobile network 24 or is already in operation within the mobile network 24.

In a step S50, the MR 10 monitors the egress characteristic thereof and starts detection as to whether or not some variation thereof occurs. In the case of no variation of the egress characteristic of the MR 10, the MR 10 continues to monitor its own egress characteristic. On the other hand, if the MR 10 has detected a variation of the egress characteristic, in a step S51, the MR 10 makes a judgment as to whether or not the access to the virtual identifier list is possible. If the MR 10 is incapable of gaining access to the virtual identifier list (in the case of having no virtual identifier list), in a step S52, the MR 10 generates a virtual identifier list. At this time, in a step S53, the MR 10 maps the egress characteristic into each virtual identifier so as to conduct the processing for storing it in the virtual identifier list. As a method involving the execution of the mapping function by the MR 10, preferably, the MR 10 carries out, for example, an algorithm capable of aggregating flows similar in type of the egress characteristic to each other and of classifying the virtual identifiers into several types and associating them. Thus, the MR 10 can aggregate the egress characteristics into types which are finite in number and manage them and, in particular, in a case in which the MRs 10 are continuously connected to each other into hierarchical relation to each other, the number of virtual identifiers is maintainable at a desired finite number.

On the other hand, when in the step S51 the MR 10 has detected that the access to the virtual identifier list is possible, in a step S54, the MR 10 conducts the processing to acquire a new egress characteristic. Upon the acquisition of the new egress characteristic, in the step S53, the MR 10 executes an operation to map a virtual identifier into the new egress characteristic. The MR 10 can first set the ranges of the virtual identifiers and add a new identifier, which does not agree with the virtual identifier first defined, on the basis of the new egress characteristic. In this preferred embodiment, the virtual identifier is, for example, an address prefix, but the present invention is not limited to this. Moreover, when all of the range of the virtual identifiers is used up, the MR 10 can then start the processing to gradually delete the obsolete virtual identifiers.

When the mapping reaches completion, in a step S55, the MR 10 conducts the processing to check whether or not the virtual identifier list is changed in comparison with the previous list. In this preferred embodiment, the change of the virtual identifier list is, for example, due to the addition or deletion of a virtual identifier, but the present invention is not limited to this. When the MR 10 has detected the change of the virtual identifier list, in a step S56, the MR 10 advertises one or a plurality of virtual identifiers to the interior of the mobile network 24. Thus, a mobile node is capable of using a virtual identifier for the setting of a flow filter policy. As the method involving the advertisement of one or a plurality of virtual identifiers by the MR 10, for example, there is a method based on the transmission of the RA 30, but the present invention is not limited to this. Even after the advertisement of one or a plurality of virtual identifiers to the mobile network 24, the MR 10 continues to monitor the egress characteristic thereof. Moreover, also in the case of no detection of the change of the virtual identifier list in the step S55, the MR 10 continuously monitors the egress characteristic thereof.

In this preferred embodiment, as one example of virtual identifier mapping, the MR 10 has three egress interfaces including diverse access systems, such as general packet radio services (GPRS), wireless local access networks (WLAN) and third-generation (3G) cellular. Each access system provides a different type service. For example, the respective access services provide services, such as GPRS (64 kbps, 0 jitter, 5 cents/min), WLAN (10 Mbps, 4-sec jitter, free) and 3G cellular (384 kbps, 1-sec jitter, 10 cents/min). The MR 10 creates virtual identifiers indicating its own diverse egress characteristics. In the embodiment of the present invention, the virtual identifiers can express combinations of bandwidth/jitter/cost with low/moderate/high, but the present invention is not limited to these. Upon the creation of the virtual identifiers, the MR 10 maps these virtual identifiers into its own physical interfaces and stores them in the virtual identifier list. In the embodiment of the present invention, the MR 10 maps the GPRS into a virtual identifier (low bandwidth, low jitter), the WLAN into a virtual identifier (high bandwidth, high jitter) and the 3G cellular into a virtual identifier (moderate bandwidth, moderate jitter).

In a case in which the MR 10 roams across the access system 20, there is a possibility that the egress characteristic thereof changes. For example, when the MR 10 moves to the exterior of a hotspot of the WLAN, it loses the WLAN connection to a WAN 22. When the MR 10 recognizes that the physical interface of a virtual identifier (high bandwidth, high jitter) is invalid (in an inactive state), it re-maps the virtual identifier (high bandwidth, high jitter) into the 3G cellular. For example, this method is conducted in a case in which each of mobile nodes having a low processing capability in the mobile network 24 does not desire to carry out the processing for always changing a parameter of flow filtering in its own filtering agent. This preferred virtual identifier re-mapping method provides an advantage in that there is no need for the MR 10 to notify the change thereof to a mobile node within the mobile network 24. According to this preferred embodiment, the mobile node is not required to grasp information on the physical egress connection of a mobile router, and the mobile router can offer a best effort routing service to the mobile node.

In addition, for example, one preferred possible way to realize this set of virtual identifiers is to use a well-known and predetermined set of bit stream patterns as identifiers. For instance, 100010 represents moderate bandwidth, low jitter and moderate cost, while 111100 designates high bandwidth, high jitter and low cost.

Another preferred possible way to realize this set of virtual identifiers is to, for example, use address prefixes as virtual identifiers. In this method, the MR 10 partitions its own mobile network prefix into diverse sub-prefixes each having a smaller address range. Moreover, at this time, one of the sub-prefixes is not mapped into any egress characteristic. This stems from the consideration of a case in which a mobile node is not designed to use a flow filtering mechanism or a case in which it is incapable of using the flow filtering mechanism. A packet to the address set on the basis of this sub-prefix is sent through a default egress route without undergoing the processing by the mapping function 17 of the MR 10. On the other hand, each of the other sub-prefixes is mapped into a specified egress characteristic such as (high bandwidth, high jitter) or (low bandwidth, low cost). The packets to the addresses set on the basis of these sub-prefixes are sent through the corresponding egress interfaces on the basis of the mapping.

This preferred method for realizing the virtual identifiers provides an advantage in that the flow filtering mapping function can be reduced to a simple address-based routing. Since a router is generally designed to send a packet on the basis of an address and to carry out the routing based on the address, the reduction of the processing load of the router becomes feasible by using a prefix as a virtual identifier. On the other hand, with the other methods for realizing a virtual identifier, a need exists for a mobile node to specify a flow characteristic for matching such as transport layer protocol number or transport layer port number. The execution of these methods requires larger-scale packet inspections in the MR 10 or in other filtering agents. Incidentally, it is obvious that this virtual identifier realizing method is also applicable to even a case in which the MR 10 has one or more MNPs.

Upon receipt of information on the egress characteristic of the MR 10, the MN 25 utilizes this information to conduct the processing for determining how to transmit the traffic from the transmission side or to the reception side. Moreover, in a preferred embodiment, as a manner that the MR 10 notifies the egress characteristic, for example, a method is available to transmit a router advertisement, but the present invention is not limited to this. Still moreover, in a preferred embodiment, for example, a physical interface or virtual identifier of the MR 10 is available as the information on the egress characteristic of the MR 10, but the present invention is not limited to this. When the MN 25 has determined a manner of transmitting or receiving a specific traffic, the MN 25 sets the contents of the determination as a filter policy in the MR 10.

In addition, in this embodiment, as an approach that the MN 25 sets a policy in the MR 10, for example, a method is available to transmit a filter policy, described in the XML (Extensive Markup Language), to the MR 10, but the present invention is not limited to this. The MR 10 stores the policy in the filter policy list. In this preferred embodiment, although the MN 25 is capable of setting the filter policy in the MR 10, a person skilled in the art would recognize that the MN 25 can set a filter policy in diverse nodes supporting the flow filtering, such as its own home agent (MN-HA), a correspondent node (CN) and an intermediate router.

Still additionally, in a preferred embodiment, the MR 10 has a plurality of egress routes to the MR-HA 23 and notifies this fact to the MN 25 in the mobile network 24. Thus, the MN 25 can set a filter policy in the MR 10 or in an MN-HA. A person skilled in the art would recognize that, since the MR-HA 23 has a plurality of egress routes to the WAN 22, the MR 10 can realize the flow filtering mechanism. The MR-HA 23 can have a plurality of routes to the WAN 22, for example, by becoming members of a plurality of service providers. In a case in which the MR 10 has established a connection with the MR-HA 23, the MR 10 receives, from the MR-HA 23, the RA 30 including information on a plurality of egress routes of the MR-HA 23. Moreover, the MR 10 uses the relevant information existing in the RA 30 to set a flow policy in the MR-HA 23, so it can carry out the flow filtering mechanism thereof. In this preferred embodiment, the MR-HA 23 notifies the egress characteristic thereof to the MR 10 by using the above-mentioned method according to the embodiment.

Yet additionally, in a further preferred embodiment, the MR 10 has a plurality of egress routes to the WAN 22 through one or a plurality of multimode access routers. In this embodiment, the multimode access router can notify the RA 30 so that the connection node can carry out the flow filtering mechanism by using the relevant information existing in the RA 30. In this embodiment, as a method involving the advertisement of an RA by the multimode router, for example, there is a method of periodically transmitting an RA to the interior of that network or a method of transmitting an RA upon receipt of a request from a specified node within the network, the present invention is not limited to this. At this time, the MR 10 uses the relevant information existing in the TA 30 to set a flow policy in the multimode access router, thereby enabling the execution of the flow filtering mechanism. In this preferred embodiment, the multimode access router notifies the egress characteristic thereof to the MR 10 by use of the above-mentioned method according to the embodiment.

Figure 6:
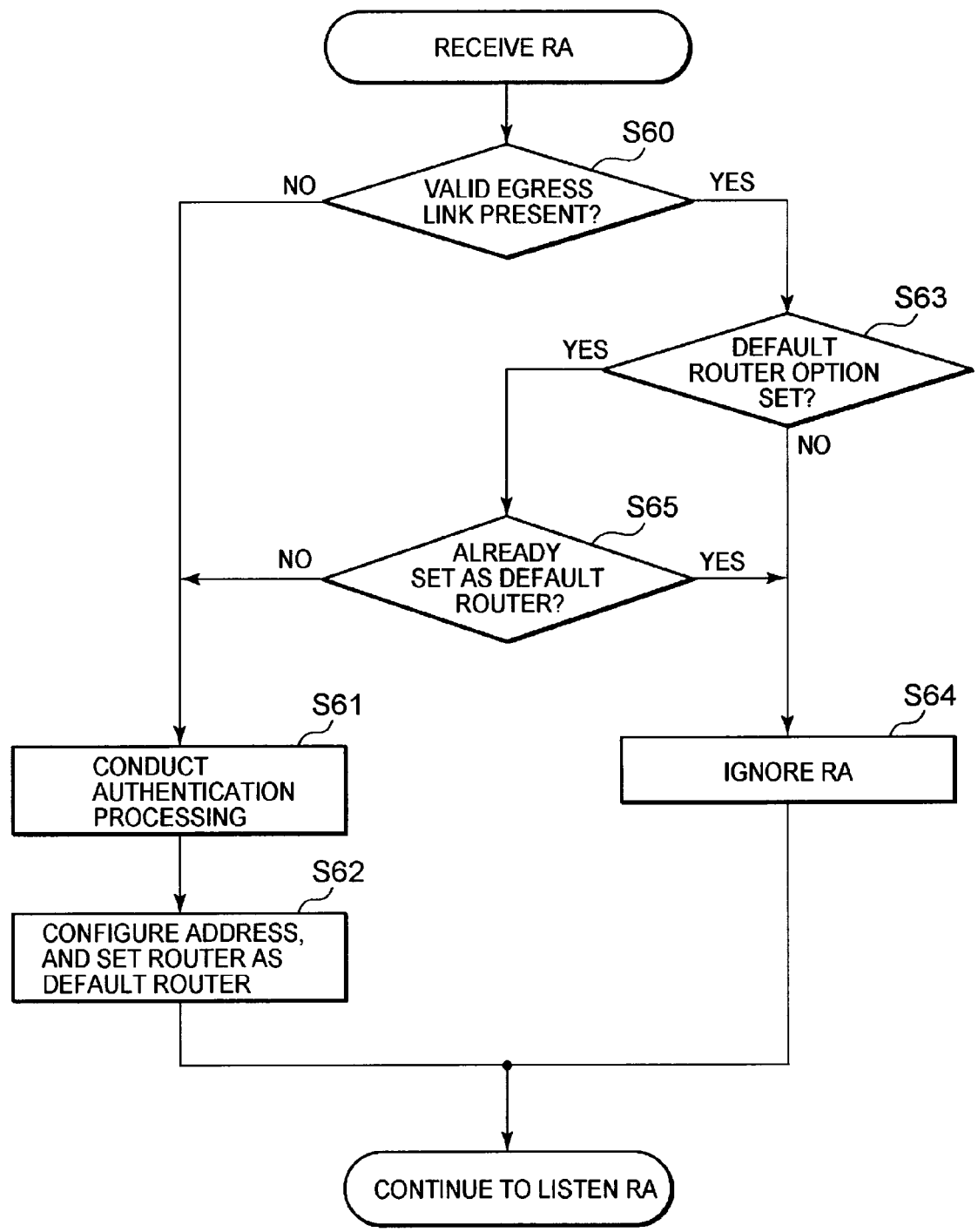
FIG. 6 is a flow chart showing one example of a default router changing method to be conducted by a mobile router in an embodiment of the present invention.

In a further preferred embodiment of the present invention, with respect to a mobile node in the mobile network 24, an option for indicating that the MR 10 is a default router can be inserted into the RA 30. FIG. 6 is a flow chart showing one example of a default router changing method to be implemented by a mobile node according to a further preferred embodiment of the present invention. In this preferred embodiment, the MN 25 pertains to the mobile network 24. The MN 25 tries to look for a router existing in the neighborhood in order to establish a connection with the WAN 22 after the activation. A method in which the MN 25 discovers the neighbor router involves, for example, hearing the router advertisement, but the present invention is not limited to this.

Upon receipt of the RA 30, in a step S60, the MN 25 checks whether or not a valid (available) egress link to a router exists. In this embodiment, in a case in which the MN 25 has detected no valid egress link, in a step S61, the MN 25 carries out the needed authentication processing with respect to a router which is transmitting the received RA 30. As a method involving the execution of the authentication processing by the MN 25, it is possible to employ, for example, the 802.1x authentication, but the present invention is not limited to this. Upon receipt of the authentication, in a step S62, the MN 25 configures an address and sets this router as a default router. Moreover, the MN 25 continuously hears the router advertisement.

On the other hand, in the case of the detection of the establishment of a valid egress link, in a step S63, the MN 25 checks the received RA 30 to make a judgment as to whether or not a default router option is set in the RA 30. If the judgment shows that a default router option is not set in the RA 30, in a step S64, the MN 25 ignores the RA 30 and continues to hear the router advertisement. Meanwhile, when the judgment shows that a default router option is set in the RA 30, in a step S65, the MN 25 checks whether or not the specified router is already set as a default router. If the router is already set as a default router, the MN 25 ignores the RA 30 received in the step S64 and continues to hear the router advertisement. However, if the router is not set as a current default router, the MN 25 carries out the processing in the steps S61 and S62 to set that router as a default router. Moreover, the MN 25 continues to hear the router advertisement.

In a case in which the MR 10 has a plurality of links to the MR-HA 23, the MR 10 can make a request to the MR-HA 23 for the duplication of flow for the passage of various egress routes of the MR 10. This increases the possibility that at least one of the flows passing through the various egress routes arrives at the MR 10. As an approach for realizing this, there is employable a method in which, for example, the MR 10 registers, in the MR-HA 23, a filtering rule which is for giving an instruction to the MR-HA 23 so that a specified flow is forwarded to the MR 10 through a plurality of egress paths.

For example, let it be assumed that the MR 10 has a flow of a VoIP (Voice over IP) passing through a wireless LAN (WLAN) interface. Since the WLAN interface has a high jitter, the MR 10 sets a filtering rule which is for giving an instruction to the MR-HA 23 so that the MR-HA 23 duplicates a VoIP flow packet and forwards the duplicated packet through a GPRS interface to the MR 10. Although the MR 10 consumes the bandwidth between the MR 10 and the MR-HA 23, this increases the possibility that the MR 10 can receive the VoIP flow packet through at least one of the WLAN interface and the GPRS interface.

Moreover, in a further preferred embodiment, it is also appropriate that the MR 10 is made to provide a flow duplication service to even a node within the mobile network 24. In this case, to the RA 30, there is added an option for notifying, to mobile nodes within the mobile network 24, the fact that the MR 10 can duplicate traffic flow within the mobile network 24. For example, although one bit in the RA 30 can be allocated to this option, the present invention is not limited to this.

Upon the detection of this option, the MN 25 can make a request to the MR 10 for the duplication of a specific traffic flow so that at least one of the traffic flows reliably arrives at the MN 25. This is useful, for example, in a situation in which only a slight delay of the traffic causes a dangerous condition of the patient, in a case with urgency, for example, when a doctor performing an operation acquires information (time critical information) on the patient from a remote location.

Still moreover, the MR 10 is required to correctly map a plurality of egress routes in a set of virtual identifiers in order for supporting a means which duplicates traffic flow of the MN 25. For example, the MR 25 can map a given virtual identifier in the GPRS and the WLAN and map a different virtual identifier in the GPRS and the 3G cellular.

Therefore, for example, in a case in which the MN 25 has traffic flow transmitted through a GPRS access system and desires to duplicate this traffic flow into a flow passing through a WLAN access system, there is a need for the MN 25 to notify, to the MR 10, an appropriate virtual identifier which allows filtering traffic flow directed to the MN 25.

Figure 7:
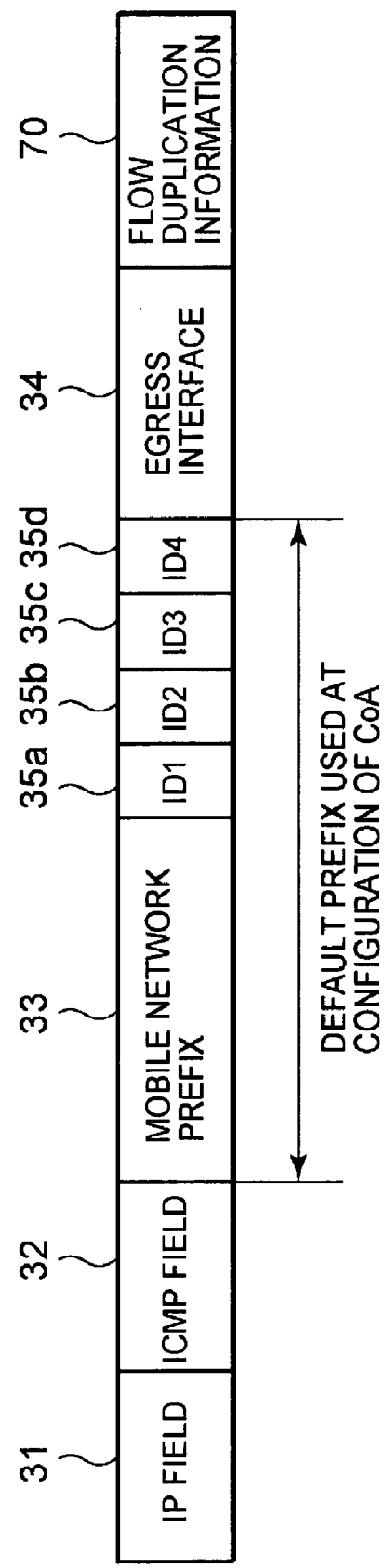
FIG. 7 is an illustration of a different example of a router advertisement to be transmitted by a mobile router in an embodiment of the present invention.

FIG. 7 is an illustration of one example of a router advertisement to be transmitted when a mobile router notifies information on traffic duplication to a mobile node in a preferred embodiment of the present invention. In FIG. 7, an RA contains an IP field 31, an ICMP field 32, a mobile network prefix 33, egress information 34, a plurality of identifiers 35a to 35d and flow duplication information 70. The information contained in the respective fields of the RA and the using purposes thereof are the same as the above-mentioned fields (the respective fields shown in FIG. 3) except the flow duplication information 70, and the description thereof will be omitted.

Owing the flow duplication information 70 appended to the router advertisement, the MN 25 can grasp that the flow duplication is executable in the interior of a mobile network (the fact that the MR 10 provides a flow duplication service).

In FIG. 7, the identifiers 35a to 35d are separated from the egress information 34 and expressed by bits constituting a portion of a prefix of an address. Thus, for example, each identifier can be expressed using one bit of a prefix to be used when the MN 25 configures a CoA and, accordingly, in a case in which a prefix of an address is used as an identifier, it is useful to separate the identifiers 35a to 35d from the egress information 34. The bit length obtained by adding the identifiers 35a to 35d to the bits of the mobile network prefix 33 corresponds to the actual length of the address prefix.

For example, the MR 10 has three egress interfaces to the access systems such as the GPRS, WLAN and 3G cellular. Each of the access systems provides a different type of service and, hence, the characteristic of each of the access systems is reflected in the egress information 34. The MR 10 uses identifiers in the RA, so the MN 25 can identify diverse egress interfaces the MR 10 has.

For example, the MR 10 can map the identifier 35b into the egress information on the GPRS interface, the identifier 35c into the egress information on the WLAN interface and the identifier 35d into the egress information on the 3G interface. Moreover, the MR 10 can notify, to the MN 25, the fact that the MR 10 supports the function to duplicate a flow of the MN 25. In this case, the identifier 35a becomes information corresponding to the flow duplication information 70, which eliminates the need for the bit arrangement of the flow duplication information 70 shown in FIG. 7.

Upon receipt of the RA, the MN 25 configures a needed filtering rule by use of the information in this RA. For example, the MR 10 can use, as an identifier, a bit included in an address prefix notified through the RA. For example, each of the identifiers 35a to 35d is expressed with one bit in the succeeding bits of the address prefix (a portion of the address prefix with respect to a legacy node), and, for making the advertisement to the MR 10 so that the MN 25 duplicates a flow through the GPRS and WLAN interfaces, at the configuration of a CoA on this flow, the MN 25 uses an address prefix including the mobile network prefix 33 in which set is an identifier corresponding to a system which desires the flow duplication.

In this case, because of the request for the duplication of a flow through the GPRS and WLAN interfaces, the bit at the position of the identifier 35b mapped into the GPRS interface and the bit at the position of the identifier 35c mapped into the WLAN interface are set at "1", while the other identifier (identifier 35d mapped into the 3G interface) is set at "0".

The MR 10 refers to the address prefix of the CoA configured in the MN 25 to specify the value of the bit corresponding to each interface, so the MR 10 can make a judgment on which of the egress interfaces the MN 25 expects for the duplication of the flow.

In the above-mentioned example, the judgment shows that the MN 25 desires the bi-cast of the flow using both the GPRS interface and the WLAN interface, and the MR 10 notifies, to the MR-HA 23, the filtering rule of the MN 25 defined by the MN 25 itself according to this bi-cast. Thus, the MR-HA 23 can carry out the filtering of the flow of the MN 25 according to the filtering rule defined by the MN 25.

In addition, with respect to a legacy node which cannot understand the present invention, a default prefix (mobile network prefix 33 and bit arrangement including all the identifiers 35a to 35d) is notified through the RA from the MR 10. For example, in a case in which an 80-bit prefix is allocated to the MR 10, the MR 10 uses 4 more bits for the identifier 35a used for the flow duplication information and the identifiers 35b to 35d mapped into the egress interfaces. Accordingly, the MR 10 notifies a prefix with 84 bits the legacy node uses. For example, preferably, in the RA, all the values of the identifiers 35a to 35d are set at "0", and the default prefix to be used by the legacy node is made so as not to overlap with a prefix set when the MN 25 handling the present invention makes a request for the flow duplication.

The legacy node uses this default (all the values of the identifiers are set at "0") prefix to configure a CoA in the mobile network 24. This method can prevent the legacy node from accidentally using the prefix for the present invention (prefix which should never be used by the legacy node).

In a further preferred embodiment, it is also acceptable that the identifiers 35a to 35d existing in the RA form a specified but arrangement pattern. This enables the MR 10 to map the respective identifiers for expressing diverse egress characteristics of the MR 10.

In addition, as mentioned above, it is also appropriate that the MR 10 maps the identifier 35a into the flow duplication information 70 and the MN 25 refers to the identifier 35a and performs the setting so as to allow the grasping of the fact that the MR 10 can duplicate the flow of the MN 25.

Still additionally, in a case in which the MN 25 desires the duplication of a specified flow to a specified egress interface of the MR 10, the MN 25 can transmit a flow policy setup 42 (message shown in FIG. 4) to the MR 10. In this case, the flow policy setup 42 contains an identifier for notifying, to the MR 10, the fact that the MN 25 desires the use of a flow duplication service of the MR 10.

Yet additionally, it is also appropriate that several identifiers in the RA are mapped into the same egress interface of the MR 25. For example, the MR 10 can carry out the mapping so that a specified type of egress characteristic is indicated by one identifier. Thus, it is possible to map one identifier to a high data rate characteristic, another identifier to a moderate data rate characteristic, a different identifier to a low data rate characteristic and a different identifier to a high jitter rate characteristic. In this case, the MN 25 can make a request for the duplication of a flow by designating the interface characteristic.

Moreover, for example, let it be assumed that, with respect to a specified flow of the MN 25, the MN 25 makes a request for flow duplication under conditions of a high data rate characteristic and a high jitter characteristic. In this case, let it be assumed that, as an egress interface which satisfies the high data rate characteristic and the high jitter characteristic, for example, only the WLAN interface exists in the MR 10. In this case, the flow of the MN 25 is merely transmitted through only the WLAN interface, and the MN 25 considers that this flow is bi-casted (or N-casted) but it cannot grasp that, in fact, the flow is not under the duplication service.

For coping with such a situation, the MR 10 adds further information to the RA to enable the advertisement to the MN 25 to the effect that all the identifiers do not support the duplication of a flow. For example, it is possible to insert the information, indicative of the fact that the above-mentioned all identifiers do not support the flow duplication, into the flow duplication information 70 of the RA.

Although in the above description the bi-cast is conducted between the MR 10 and the MR-HA 23, the MN 25 can execute the control as to how to duplicate a flow in the entire system (flow duplication method). For example, even in a case in which the MN 25 desires to perform the bi-cast of a specified flow from the HA of the MN 25 itself to the MR-HA 23 or even when it desires to carry out the tricast of a specified flow from the MR-HA 23 to the MR 10, the MN 25 can use the information in the received RA to set up a filtering policy for realizing a desired flow duplication in the home agent of the MN 25 or in the MR 10.

Still moreover, in a further embodiment, the MN 25 can acquire the flow duplication information through the use of a stateful address auto configuration means such as DHCPv6. For example, in a case in which the MN 25 receives a DHCP discovery message in the mobile network 24, a DHCP server in the mobile network 24 issues a response to the MN 25 through the use of a DHCP offer message. It is acceptable that the DHCP offer message contains a list of addresses, a description of a network characteristic associated with each of the addresses, flow duplication information (i.e., information indicative of whether or not the MR 10 offers a flow duplication service to mobile nodes), and others, but the present invention is not limited to this. In this connection, if the flow duplication information is inserted into an address (address prefix), it is also acceptable that this address is mapped into the egress characteristic. That is, for example, it is also possible that the identifier 35a indicative of the support of the flow duplication is mapped into an arbitrary egress characteristic at the same time. When the MN 25 sets a value at a bit of the identifier 35a, the MR 10 accomplishes the flow duplication corresponding to this value.

Although there is no need for the DHCP server and the MR 10 to pertain to the same entity, in the case of different entities, it is necessary that the MR 10 and the DHCP server interchange the information on an egress network characteristic and the information on a mapping method between a virtual identifier and an address prefix.

Furthermore, as mentioned above, according to the present invention, if a variation of the egress characteristic occurs, the MR 10 notifies the contents of this variation to the mobile network 24 under it, thereby providing a method in which the MN 25 itself again sets a flow policy and a method in which the MR 10 changes the mapping of the virtual identifier according to the variation of the egress characteristic so that the variation of the egress characteristic does not propagate into the mobile network 21 so as to eliminate the need for the MN 25 to again sets the flow policy. It is also appropriate that the MN 25 is capable of selecting one of these methods.

Still furthermore, for example, under a situation that the MR 10 manages an egress characteristic through the use of a virtual identifier, it is also appropriate that the MN 25 connected to the mobile network 24 thereunder explicitly makes inquiries at the MR 10 about the state of the egress characteristic of the egress interface. In this case, upon receipt of the inquiry from the MN 25, the MR 10 unicast-transmits the RA 30 including the egress information 34 to the MN 25, so the MN 25 itself can notify the information for the re-setting of the flow policy.

For example, in a case in which states where MRs are connected to different mobile networks exist in a hierarchical fashion, the egress information broadcasted by one MR and the variation thereof successively propagate as a variation of the egress characteristic of a lower-layer MR, so it obviously functions effectively as a whole.

In addition, a mobile router according to the present invention is a terminal device having an individual entity and is also applicable to a logical existence equipped with software or the like, which moves as a logical entity between fixed stations serving as the actual mobile terminal connection points and which provides a mobile network to a mobile terminal.

Still additionally, although in this specification the MN 25 is exemplified as a mobile node which conducts an operation regarding the mobile IPv6 (further, extension of Monami6), a mobile node in this specification can be a mobile router or a device using some multihoming protocol (for example, Shim6) but not using the mobile IPv6 and having a function using a different source address with respect to a different flow.

In this specification, a mobile router which carries out a method specified by the present invention supports the flow filtering in a mobile network. However, a method of supporting the flow filtering specified in the present invention can be executed, for example, in a multimode node (i.e., node other than an MR), capable of carrying out routing, such as an access router (AR) having a plurality of links to the internet.

In this case, the AR maps diverse egress characteristics thereof into identifiers and advertises the identifiers mapped into the egress characteristics of the AR for allowing an MN to select an appropriate CoA with regard to a specified flow. This method is applied to, for example, a case in which an MN makes a communication with its own home agent. Thus, the HA establishes a connection with the internet through a plurality of links, and a plurality of flows are transmitted through different egress routes between the HA and the AR.

As stated previously, the filtering agent may also be a correspondent node (CN). Referring to FIG. 2, in another preferred embodiment of the invention, the MR-HA 23 can be replaced with a CN 23 in which the MN 25 is having a communication session with. One example could be that the CN 23 is a server that provides services (e.g. video, electronic mail) to the MN 25 via some subscription plan. The MN 25 chooses to have an optimized connection to the CN 23 in order to reduce the overheads incurred via the home agents when triangular routing is performed. Thus, the method described in Patent Document 6 may be used to achieve such optimization in routing by having the MR 10 setting up bi-directional tunnels with CN 23 for direct communications. This implies that the MR 10 would also advertise a home address of the MR 10 along with the egress characteristics of the MR 10.

In such a preferred embodiment, to ensure that the flow filtering support to the MN 25 remains undisrupted, the MR 10 would be required to configure filter rules at the CN 23. One method to achieve this is through the use of prefix-bind flag sent to the CN 23. The prefix-bind flag would allow the CN 23 to inform the MR 10 that in addition to setting up bi-directional tunnels 21 with the CN 23, the MR 10 should also set the appropriate filter rules at the CN 23 for flow filtering.

Figures 8, 9:
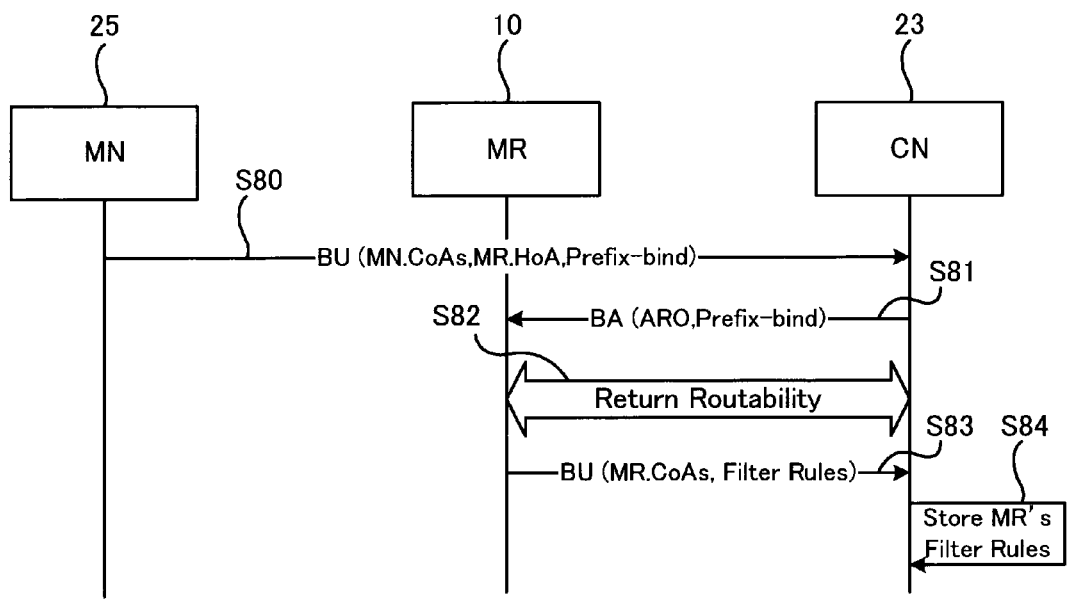
FIG. 8 is a sequence chart showing how a mobile router could set filter rules for flow filtering at a correspondent node in another preferred embodiment of the invention.
FIG. 9 is an illustration of a binding cache entry of a correspondent node according to a preferred embodiment of the invention.

FIG. 8 is a sequence chart showing how a mobile router could set filter rules for flow filtering at a correspondent node in another preferred embodiment of the invention. In FIG. 8, the MN 25 sends a binding update (BU) to the CN 23 in step S80. According to this preferred embodiment, the BU would include, but not limited to, various care-of addresses (MN.CoAs) that the MN 25 wants to bind at the CN 23, a home address of MR 10 (MR.HoA) and a prefix-bind flag. When the CN 23 processes the BU, the CN 23 notes the presence of MR.HoA and the prefix-bind flag. Thus, the CN 23 replies the MN 25 with a binding acknowledgment (BA) in step S81. The BA may include, but not restricted to, an access router option (ARO) along with the prefix-bind flag. With the presence of ARO in the BA, the MR 10 would initiate the return routability procedure in step S82 to setup the necessary bi-directional tunnels 21 to the CN 23.

Also, since the BA also contains a prefix-bind flag, the MR 10 would further configure filter rules at the CN 23 for flow filtering between the MR 10 and the CN 23. Thus, the MR 10 sends a BU in step S83 to the CN 23 for such a purpose. Such a BU may include, but not limited to, various care-of addresses (MR.CoAs) that the MR 10 wants to bind at the CN 23 along with the filter rules of the MR 10. The filter rules allow the MR 10 to convey the routing preferences of the MR 10 to the CN 23. Typically, the filter rules would be a mapping between the care-of addresses of the MR 10 against identifiers 35. For this preferred embodiment, identifiers 35 represent prefixes. In yet another preferred embodiment, identifiers 35 represent pre-determined bit strings. Finally, the CN 23 would store the filter rules of the MR 10 in step S84 in order to allow the CN 23 to ensure that flows directed to the MR 10 are filtered accordingly. Optionally, the CN 23 can send a BA to the MR 10 indicating that the bindings between the MR 10 and CN 23 have been correctly configured.

The following example is given to explain the method described previously in more clarity. In this example, identifiers 35 represent prefixes. The MR 10 has an interface associated with the 3G cellular network (MR.CoA1) and an interface associated with the WLAN (MR.CoA2). The MR 10 maps one prefix (MR.MNP1) to 3G cellular and another prefix (MR.MNP2) to WLAN. These prefixes are then advertised in the mobile network. With the presence of the ARO and prefix-bind flag in the binding acknowledgment message, the MR 10 performs the return routability procedure with the CN 23. Such a procedure involves a series of message exchanges to allow the CN 23 to verify that MR.CoA1 and MR.CoA2 are indeed reachable. Once the verification is complete, the MR 10 would proceed to send a binding update message which binds MR.CoA1 and MR.CoA2 at the CN 23. In addition, the MR 10 would also set filter rules at the CN 23 due to the presence of the prefix-bind flag. Therefore, the MR 10 sends the mapped prefixes for MR.MNP1 and MR.MNP2 to the CN 23 via the binding update message. Such filter rules would allow the CN 23 to direct traffic flow to the MR 10 via the preferred route of the MR 10.

FIG. 9 is an illustration of a binding cache entry of a correspondent node according to a preferred embodiment of the invention. In FIG. 9, the binding cache entry (BCE) 90 for CN 23 includes a Home Address (HoA) column 91, a Filter Identification (FID) column 92, a Care-of Address (CoA) column 93, an Access Router Option (ARO) column 94 and a Prefix-Bind column 95. The HoA column 91 includes the home addresses (HoAs) of nodes that have a binding with the CN 23. With the HoA column 91, the CN 23 would be able to identify if a particular flow is meant for a node. Once identified, the CN 23 proceeds to check if filter rules have been set for the flow by referring to the FID column 92. The FID column 92 typically includes the identification of filter rules stored at the CN 23. Such identification allows the CN 23 to find the corresponding filters to apply to the flow.

The matching of a filter usually indicates to the CN 23 that the flow is meant to be sent to a specific address of the receiving node. Such an address would be indicated in the CoA column 93 of BCE 90. The CoA column 93 in general includes the care-of addresses of mobile nodes. Thus, such indication would allow the CN 23 to route the flow to the preferred CoA of a mobile node. Additionally, if the CN 23 sees an ARO option associated to the preferred CoA of the mobile node, the CN 23 understands that the mobile node is currently located at a mobile router that has a binding with the CN 23. Such an ARO column 94 would typically include the HoA of the mobile router. Therefore, the CN 23 would then find the corresponding CoA that is mapped to the HoA of the mobile router and route the flow to the specified CoA.

This invention introduces the Prefix-Bind column 95 in BCE 90. The purpose of Prefix-Bind column 95 is to allow the CN 23 to the routing preferences of a mobile router. In a preferred embodiment of our invention, the Prefix-Bind column 95 would contain identifiers 35 which could include, but not limited to the mobile network prefixes or pre-determined bit strings. The CN 23 would use the Prefix-Bind column 95 to perform prefix matching based on the destination address of the flow. When the best prefix match is found, the CN 23 would then route the flow to the specified CoA of the mobile router.

An example would now be given in order to provide more clarity on the method that was just described. Referring to FIG. 9, the CN 23 identifies that a video stream (FID1) is to be routed to the MN 25 (MN.HoA). Additionally, the CN 23 notes that the MN 25 has set filter rules indicating that FID1 would be routed via MN.CoA1. Since MN.CoA1 is associated with an ARO option, the CN 23 understands that the MN 25 is currently located in the mobile network of the MR 10. Based on home address of the MR 10 (MR.HoA), the CN 23 finds that the MR 10 can be reached via two possible CoAs (MR.CoA1, MR.CoA2). As such, the CN 23 matches MN.CoA1 to the MNPs specified by the MR 10 in an attempt to find the best possible match. Since MN.CoA1 is configured using MR.MNP1, the CN 23 identifies MR.MNP1 as the best possible fit. Thus, the CN 23 would route the video stream to the MN 25 via MR.CoA1 thereby skipping the home agent of the MR 10.

In yet another preferred embodiment of the invention, identifiers 35 represent bit strings which are stored in the Prefix-Bind column 95 of BCE 90. Thus, the MN 25 would set the FID for each flow to be similar with the bit strings advertised by the MR 10. For example, the MR 10 represents ID1 35a as 100110 which is mapped to WLAN. When the MR 10 set filter rules at the CN 23, the Prefix-Bind column 95 would map 100110 to MR.CoA2. Therefore, when the MN 25 wants to receive a data stream from the CN 23 via the WLAN, the MN 25 sets the FID as 100110. Thus, this allows the CN 23 to map the FID to the intended care-of address of the MR 10 (MR.CoA2)

Previously, the invention describes methods in achieving flow control in an optimizing routing condition between a mobile router and a correspondent node. However, it is obvious to a person skilled in the art that the same methods can also be applied to between a mobile router and a home agent of the mobile node.

Furthermore, the following technical ideas are supported by this specification.

The present invention provides an apparatus for flow control which performs the additional method of performing flow control when an optimized route is present.

The above method may comprise:

i) a step in which a mobile node (MN) sends a binding update (BU) to a correspondent node (CN), wherein the BU contains an access router option (ARO) and a prefix binding flag;

ii) a step in which the CN sends a binding acknowledgement (BA) to the MN via a mobile router (MR), wherein the BA contains an ARO telling the MR to do route optimization (RO) and a prefix binding flag;

iii) a step in which the MR sets filter rules at the CN upon seeing the prefix binding flag; and iv) a step in which the CN stores the filter rules set be the MR in binding cache entry (BCE).

Furthermore, the above mentioned filter rules set by the MR may represent a mapping between MR's prefixes and MR's care-of addresses (CoAs).

Furthermore, the above mentioned filter rules set by the MR may represent a mapping between bit strings and MR's care-of addresses (CoAs).

Furthermore, the present invention provides a mobile node comprising a means for generating a binding update (BU) containing an access router option (ARO) and a prefix binding flag, and a means for sending the BU to a correspondent node (CN).

Furthermore, the present invention provides a correspondent node comprising a means for receiving a binding update (BU) from a mobile node (MN), wherein the BU contains an access router option (ARO) and a prefix binding flag, a means for generating a binding acknowledgement (BA) containing an ARO telling the MR to do route optimization (RO) and a prefix binding flag, a means for sending the BA to the MN via a mobile router (MR), and a means for storing filter rules set by the MR in binding cache entry (BCE).

Furthermore, the present invention provides a mobile router comprising a means for receiving a binding acknowledgement (BA) from a correspondent node (CN) to a mobile node (MN), wherein the BA contains an ARO telling the MR to do route optimization (RO) and a prefix binding flag, and a means for setting filter rules at the CN upon seeing the prefix binding flag in the BA.

Although in this specification the present invention is illustrated and described while consideration is given to more practical and preferred embodiments, it is obvious to a person skilled in the art that the details of the design and parameters can be diversely modified so as not to constitute departures from the spirit and scope of the invention.

Furthermore, the respective functional blocks used in the above description of the respective embodiments of the present invention are typically realized with an LSI (Large Scale Integration) which is an integrated circuit. It is also acceptable that these blocks are individually formed as one chip, or that a portion of or all of these blocks are formed as one chip. Although an LSI is taken in this case, it is sometimes referred to as an IC (Integrated Circuit), system LSI, super LSI or ultra LSI according to the level of integration.

Moreover, the technique for the formation of an integrated circuit is not limited to the LSI, but it is also realizable with a dedicated circuit or a general-purpose processor. After the manufacturing of an LSI, it is also acceptable to utilize an FPGA (Field Programmable Gate Array) which enables the programming or a reconfigurable processor which allows the reconfiguration of connections and setting of circuit cells in the interior of the LSI.

Still moreover, if a technique for the formation of an integrated circuit replaceable with the LSI appears owing to advance in semiconductor technology or a different technology derived therefrom, the functional blocks can naturally be integrated through the use of this technique. For example, a biotechnology or the like may be applicable.

INDUSTRIAL APPLICABILITY

The present invention provides an advantage of solving a problem which arises in a case in which a mobile node configures a flow policy through a proxy node and an advantage of enabling a mobile node connected to a mobile network of a mobile router mentioned in NEMO to carry out a flow filtering mechanism mentioned in Monami6, and the present invention is applicable to a communication technology in a mobile communication network or a technique related to a flow filtering executing method to be conducted by a mobile node existing within a mobile communication network.

The invention claimed is:

1. An apparatus for flow control which is located in a mobile router having a mobile network as a subordinate, comprising:
a plurality of egress interfaces used for communication with a node existing in the exterior of said mobile network, each of the plurality of egress interfaces having a different traffic characteristic;
one or a plurality of ingress interfaces used for communication with a node connected to said mobile network;
a filter policy list storing a flow filter policy describing at least an association between traffic of the node connected to said mobile network and identification information of one of said egress interfaces to be used for the traffic among the plurality of egress interfaces; and
a matching unit for, when a packet is transferred from the node connected to said mobile network, retrieving the flow filter policy of the node connected to said mobile network from said filter policy list to select the egress interface to be used for transferring the packet by referring to the retrieved flow filter policy,
a characteristic information inserting unit for inserting information indicative of a network characteristic, with which the egress interface of said mobile router is in connection, into a router advertisement message to be transmitted through one of the ingress interfaces into the interior of said mobile network,
a virtual identifier information setting unit for setting virtual identifier information for identifying the information indicative of the network characteristic;
a virtual identifier information storing unit for storing an association between the virtual identifier information and the network characteristic; and
a virtual identifier information updating unit for, when a variation of the network characteristic occurs, re-establishing the association between the virtual identifier information and the network characteristic so as to update the association between the virtual identifier information and the network characteristic.

2. An apparatus for flow control which is located in a mobile router having a mobile network as a subordinate, comprising:
a plurality of egress interfaces used for communication with a node existing in the exterior of said mobile network, each of the plurality of egress interfaces having a different traffic characteristic;
one or a plurality of ingress interfaces used for communication with a node connected to said mobile network;
a filter policy list storing a flow filter policy describing at least an association between traffic of the node connected to said mobile network and identification information of one of said egress interfaces to be used for the traffic among the plurality of egress interfaces; and
a matching unit for, when a packet is transferred from the node connected to said mobile network, retrieving the flow filter policy of the node connected to said mobile network from said filter policy list to select the egress interface to be used for transferring the packet by referring to the retrieved flow filter policy,
wherein each of said plurality of egress interfaces is associated with a value of a specified one bit of an address prefix for use in said mobile network, and information containing the address prefix set so that the packet is transmitted through each of said plurality of egress interfaces according to the specified one bit value associated with each of said egress interfaces is inserted into a router advertisement message transmitted through the ingress interface to the interior of said mobile network.

3. An apparatus for flow control which is located in a mobile router having a mobile network as a subordinate, comprising:
a plurality of egress interfaces used for communication with a node existing in the exterior of said mobile network, each of the plurality of egress interfaces having a different traffic characteristic;
one or a plurality of ingress interfaces used for communication with a node connected to said mobile network;
a virtual identifier information setting unit for setting virtual identifier information for identifying information indicative of a network characteristic, with which one of the egress interfaces of said mobile router is in connection;
a virtual identifier information storing unit for storing an association between the virtual identifier information and the network characteristic; and
a virtual identifier information updating unit for, when a variation of the network characteristic occurs, re-establishing the association between the virtual identifier information and the network characteristic so as to update the association between the virtual identifier information and the network characteristic.

* * * * *